(12) United States Patent  
Spilker

(10) Patent No.: US 9,638,369 B1
(45) Date of Patent: May 2, 2017

(54) ICE MAKER PROTECTION BOX SYSTEMS

(71) Applicant: Jeff Spilker, Colorado Springs, CO (US)

(72) Inventor: Jeff Spilker, Colorado Springs, CO (US)

( * ) Notice: Subject to any disclaimer, the term of this patent is extended or adjusted under 35 U.S.C. 154(b) by 0 days.

(21) Appl. No.: 14/334,732

(22) Filed: Jul. 18, 2014

Related U.S. Application Data

(60) Provisional application No. 61/858,571, filed on Jul. 25, 2013.

(51) Int. Cl.
- F16L 57/00 (2006.01)
- F16L 57/02 (2006.01)
- F16L 57/06 (2006.01)
- F16L 5/10 (2006.01)

(52) U.S. Cl.
CPC ............ F16L 57/06 (2013.01); F16L 57/00 (2013.01); F16L 57/02 (2013.01); F16L 5/10 (2013.01)

(58) Field of Classification Search
CPC ... F16L 5/10; F16L 57/00; F16L 57/02; F16L 57/06
USPC ........................................ 137/360, 377, 382
See application file for complete search history.

(56) References Cited

U.S. PATENT DOCUMENTS

| | | | |
|---|---|---|---|
| 3,540,747 A * | 11/1970 | Stjernstrom | F16J 15/106 174/153 G |
| D257,761 S | 1/1981 | Abel | |
| D330,734 S * | 11/1992 | Luten | D21/392 |
| D336,424 S | 6/1993 | Barber | |
| 5,988,208 A * | 11/1999 | Tudhope | F16L 35/00 137/360 |
| 6,467,734 B1 | 10/2002 | Brown | |
| 6,604,890 B2 | 8/2003 | Tresch | |
| D523,740 S | 6/2006 | Harris | |
| 7,077,156 B1 * | 7/2006 | Humber | F16K 27/0218 137/360 |
| 7,159,406 B2 | 1/2007 | Schuchart | |
| 8,245,862 B2 * | 8/2012 | Gates, II | H01R 25/006 220/3.8 |
| 8,567,432 B2 * | 10/2013 | Ericksen | F16K 27/12 137/343 |
| 2004/0211162 A1 * | 10/2004 | Henrikson | B01D 46/10 55/385.2 |
| 2008/0093365 A1 * | 4/2008 | Catron | A61J 1/1437 220/345.1 |
| 2009/0145493 A1 * | 6/2009 | Lee | E03C 1/021 137/360 |

* cited by examiner

Primary Examiner — Mary McManmon
Assistant Examiner — Richard K Durden
(74) Attorney, Agent, or Firm — Spencer Fane LLP

(57) ABSTRACT

The ice maker protection box system is a durable plastic box assembly that mounts on the wall around a water valve assembly, and protects a refrigerator water supply line from pinching and kinking. It has a transparent cover which slides upwardly along flanges to access the water connection. The ice maker protection box assembly further provides ample space behind a refrigerator for airflow to maximize refrigeration potential.

14 Claims, 5 Drawing Sheets

ICE MAKER PROTECTION BOX SYSTEMS

CROSS-REFERENCE TO RELATED APPLICATION

The present application is related to and claims priority from prior provisional application Ser. No. 61/858,571, filed Jul. 25, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of water line use with appliances and more specifically relates to a water line protection device that creates an ample amount of space between a refrigerator and a water supply line behind a refrigerator to keep the water line from kinking and pinching.

2. Description of the Related Art

When refrigerators are positioned flush against a wall, the water line that connects to the main supply can become pinched and kinked. This not only blocks water flow to the refrigerator's water filter and ice cube maker, but also causes potential leaks. Unfortunately, water leaks can significantly increase homeowner's insurance, which is already a costly investment. Additionally, with the refrigerator pushed against a wall, air cannot properly flow into and out of a refrigerator's cooling system, causing potential overheating issues and reduced life expectancy, but also reducing overall performance. A solution is needed.

Various attempts have been made to solve the above-mentioned problems such as those found in U.S. Pat. No. 7,159,406 to Ryan D. Schuchart; U.S. Pat. No. 6,467,734 to Larry D. Brown; and U.S. Pat. No. 6,604,890 to Rudolf Tresch. This art is representative of water line anti-kink devices. None of the above inventions and patents, taken either singly or in combination, is seen to describe the invention as claimed.

Ideally, a water line anti-kink device should provide ease of use and, yet would operate reliably and be manufactured at a modest expense. Thus, a need exists for a reliable ice maker protection box system to provide ample space behind a refrigerator to keep an ice maker water line from kinking and pinching, and provide adequate air flow behind the refrigerator for maximum performance, and to avoid the above-mentioned problems.

BRIEF SUMMARY OF THE INVENTION

In view of the foregoing disadvantages inherent in the known water line anti-kink art, the present invention provides a novel ice maker protection box system. The general purpose of the present invention, which will be described subsequently in greater detail is to provide an ice maker water supply line protection device which keeps a refrigerator from being pushed against a wall and kinking or pinching a water supply line. It further serves to allow ample space behind the refrigerator to allow and maintain maximum air circulation for the refrigeration system.

An ice maker protection box system is described herein in a preferred embodiment comprising: an ice maker protection box assembly having a formed housing, and a transparent cover in functional combination, which may be manufactured with a durable plastic material to maintain a substantially waterproof integrity. The formed housing has an opening on the back side to allow mounting of the ice maker protection box assembly to a flat planar surface. The ice maker protection box assembly mounts parallel to a wall surface and around a water valve assembly with a plurality of fasteners or with double-sided tape as needed for protection of the water supply line.

The ice maker protection box assembly in preferred embodiments is approximately 1.5 inches in depth to allow ample space for air circulation behind a refrigerator when the refrigerator is pushed back to a useable position, which helps further increase airflow behind the refrigerator for maximum refrigeration performance. The ice maker protection box assembly prevents a refrigerator from being pushed against a wall and pinching the water supply line. The ice maker protection box assembly has a plurality of indentations around the periphery to allow water supply line routing, and is available in various sizes to accommodate substantially any water supply line. The indentations of the formed housing allow a water supply line to protrude at substantially any angle as needed for use and facilitates proper water flow for maximum icemaker performance.

The formed housing further has a plurality of flanges along the outer edges to allow a transparent cover to be securely mounted to the formed housing. The transparent cover slideably mounts to the formed housing using the plurality of flanges as guides, and is able to slide upwardly along the plurality of flanges to access the water supply line and connection as needed. The transparent cover retains the water supply line within the formed housing for protection of the water supply line. The transparent cover is preferably made of durable, flat, transparent material to allow ease of viewing the water supply line connection, and has a rubber grommet attached to the lower mid-point to allow a water supply line to pass through for use as needed. The cover may be a solid piece or a frame that would retain the hose.

The ice maker protection box assembly is able to mount to a flat planar surface around a water valve assembly, allowing a water supply line to pass through an indentation and connect to the water valve assembly, keeping the water supply line from pinching and kinking, allowing an unobstructed water supply to the ice maker.

The present invention holds significant improvements and serves as an ice maker protection box system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, ice maker protection box system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a water line anti kink device and more particularly to a ice maker protection box system as used to improve the ability of a user to push a refrigerator back to a useable position without pinching or kinking a water supply line and having ample space for airflow behind the refrigerator.

Generally speaking, an ice maker protection box assembly mounts on the wall around a water valve assembly, and protects a water supply line from pinching and kinking. The ice maker protection box assembly further provides ample space behind a refrigerator for airflow to maximize refrigeration potential.

Figure 1:
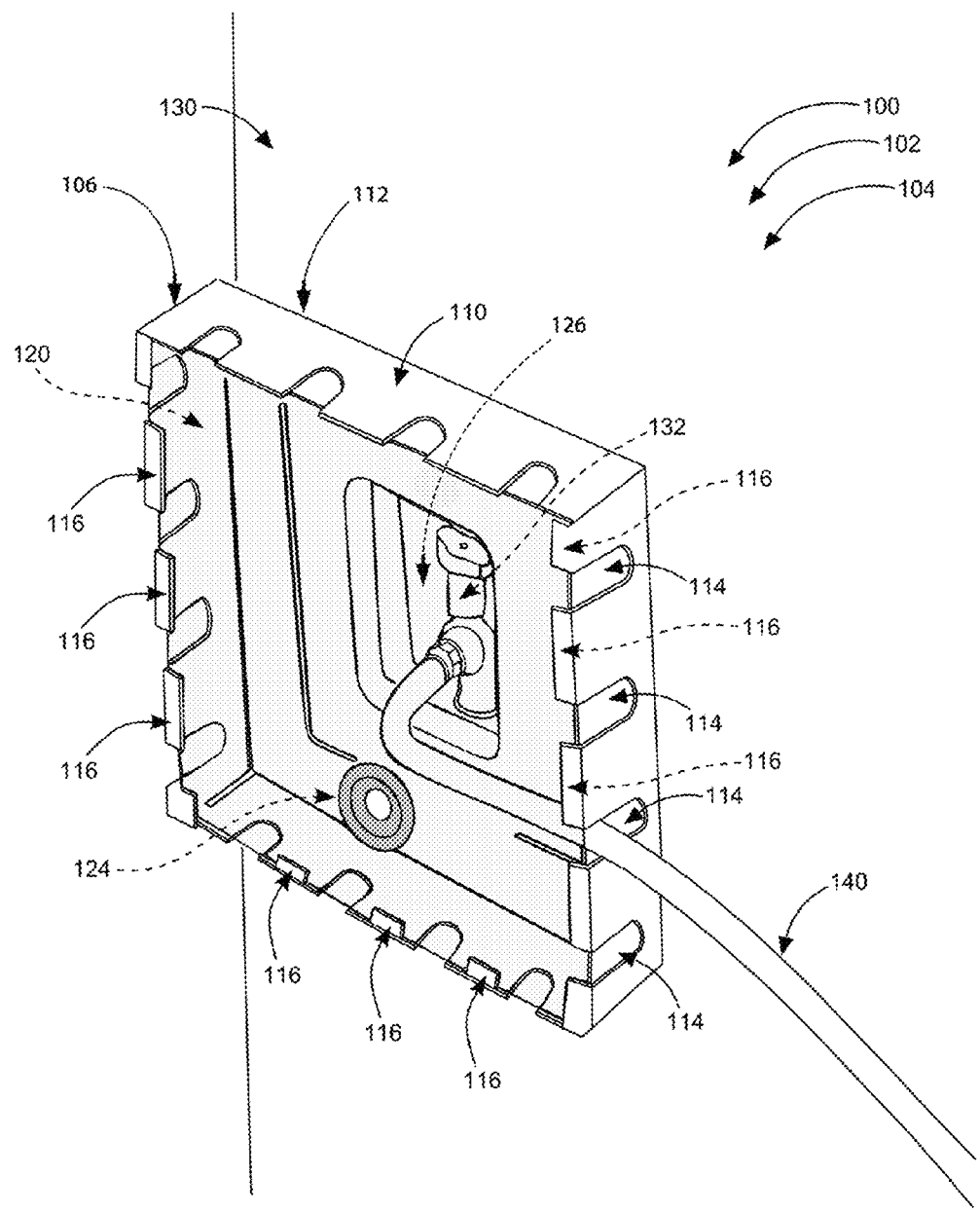
FIG. 1 shows a perspective view illustrating an ice maker protection box system in an in-use condition according to an embodiment of the present invention.

Referring to the drawings by numerals of reference there is shown in FIG. 1, a perspective view illustrating an in-use condition 104 of ice maker protection box system 100 according to an embodiment of the present invention.

Ice maker protection box system 100 in a preferred embodiment comprises: ice maker protection box assembly 102 having formed housing 110 comprising: a back side 112 having an opening 126 therein for access to a water valve assembly 132, a plurality of indentations 114 around a periphery 106; and a transparent cover 120 in functional combination, and is manufactured with durable plastic material to maintain a substantially waterproof integrity (other materials may be used such as ferrous materials for longevity of use and durability). Formed housing 110 comprises a plurality of flanges 116 positioned along periphery 106. Formed housing 110 has said opening 126 on back side 112 to allow mounting of ice maker protection box assembly 102 to a flat planar surface. Transparent cover 120 has rubber grommet 124 attached to the lower mid-point to allow water supply line 140 to pass through for use as needed. Ice maker protection box assembly 102 mounts parallel to wall surface 130 and around water valve assembly 132 for protection of water supply line 140.

Figure 2:
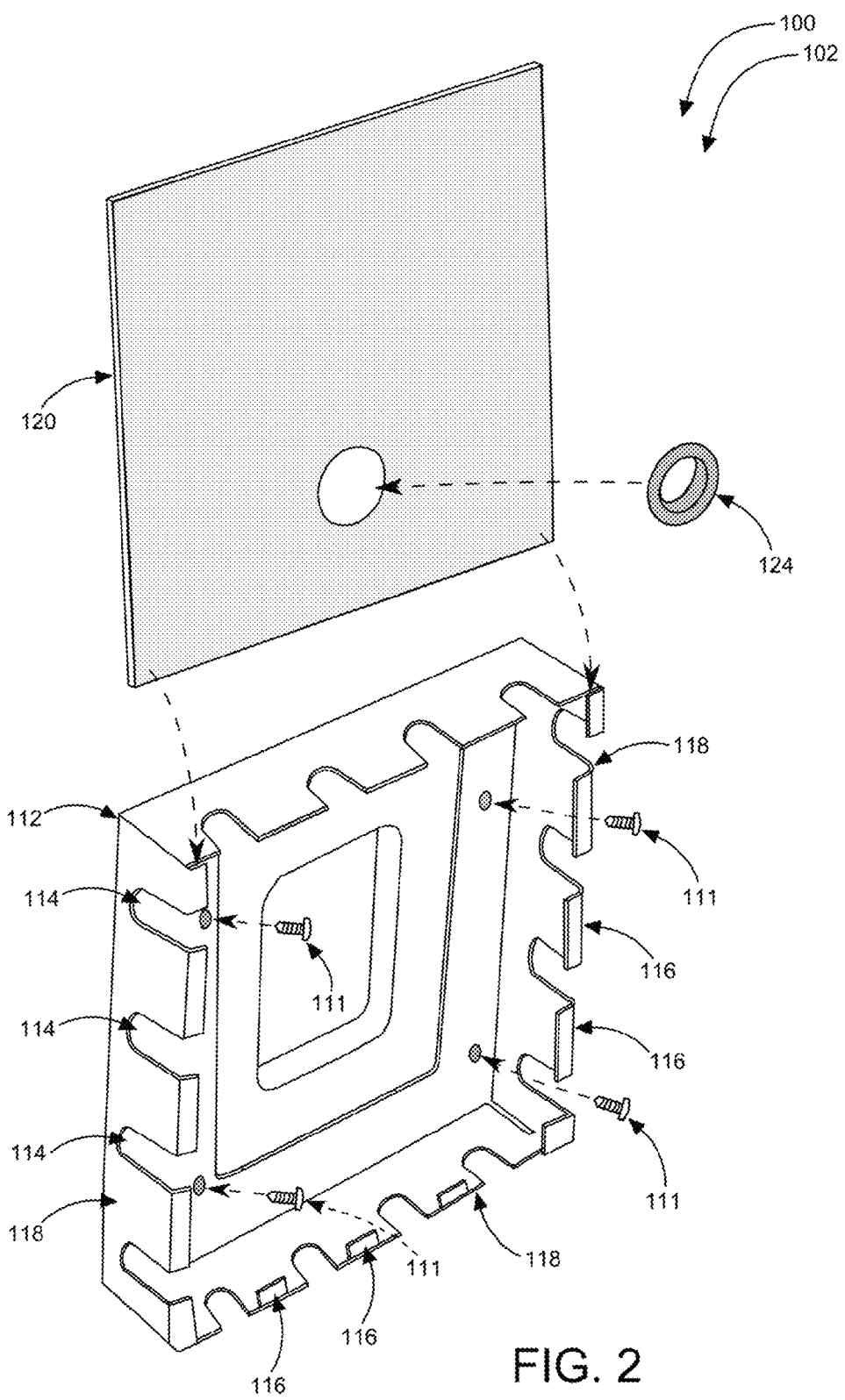
FIG. 2 is an exploded view illustrating an ice maker protection box assembly according to an embodiment of the present invention of FIG. 1.

Referring now to FIG. 2, an exploded view illustrating ice maker protection box assembly 102 according to an embodiment of the present invention of FIG. 1.

Ice maker protection box assembly 102 is approximately 1.5 inches in depth to allow ample space for air circulation behind a refrigerator when the refrigerator is pushed back to a useable position, which helps further increase airflow behind the refrigerator for maximum refrigeration performance. Ice maker protection box assembly 102 prevents a refrigerator from being pushed against a wall and pinching water supply line 140. Ice maker protection box assembly 102 has plurality of indentations 114 around the periphery to allow water supply line 140 routing, and is available in various sizes to accommodate substantially any water supply line 140. Plurality of indentations 114 on formed housing 110 allow water supply line 140 to pass through periphery 106 for use and facilitates proper water flow for maximum icemaker performance. A plurality of fasteners 111 may be provided to mount ice maker protection box assembly 102 to wall surface (as shown in FIG. 1). A transparent cover 120 is configured and dimensioned to demountably attach to periphery 106.

Figure 3:
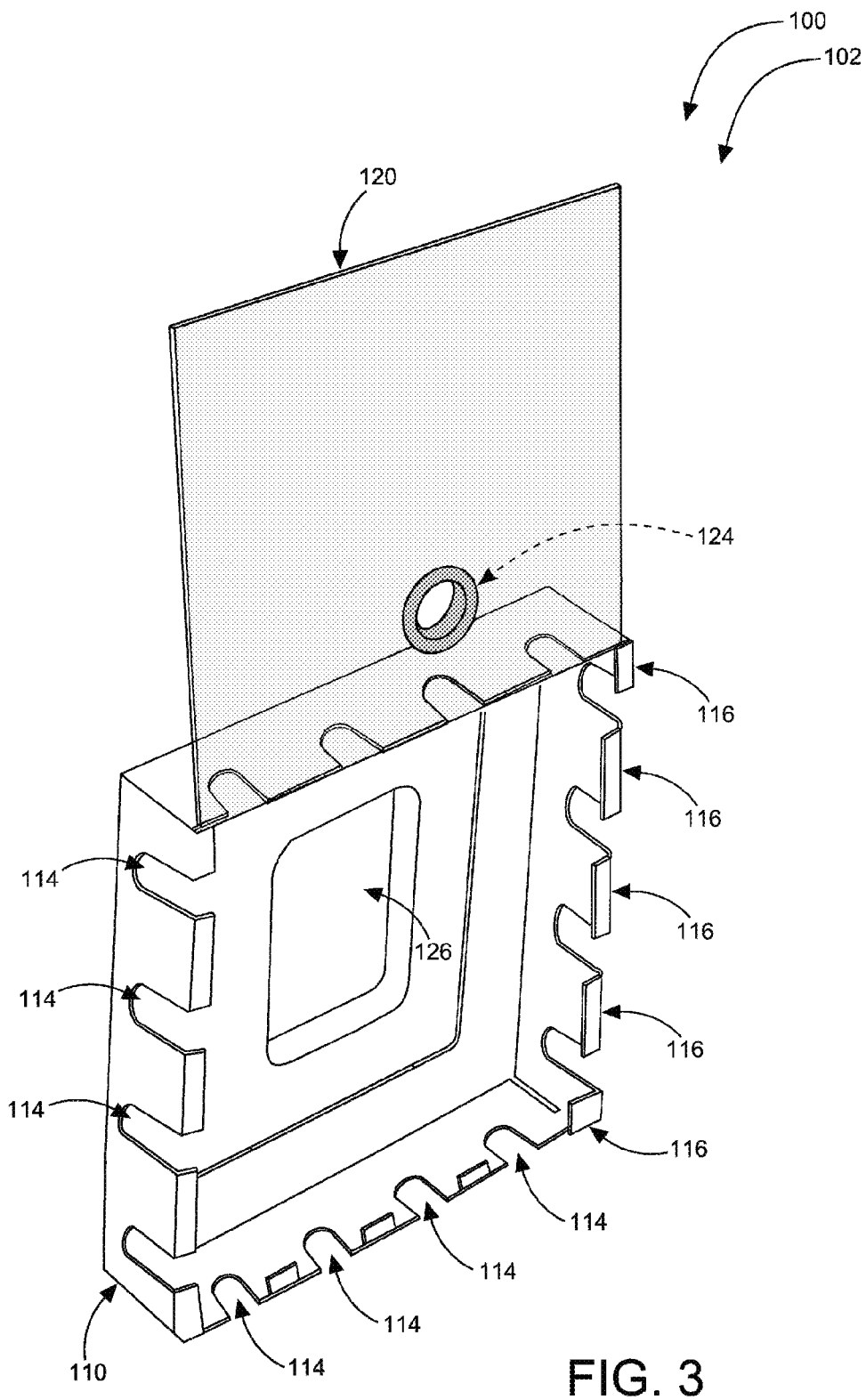
FIG. 3 is a perspective view illustrating the ice maker protection box assembly according to an embodiment of the present invention of FIG. 1.

Referring now to FIG. 3, a perspective view illustrating ice maker protection box assembly 102 according to an embodiment of the present invention of FIG. 1.

Formed housing 110 further has plurality of flanges 116 along outer edges 118 to allow transparent cover 120 to be securely mounted to formed housing 110. Transparent cover 120 slideably mounts to formed housing 110 using plurality of flanges 116 as guides, and is able to slide upwardly along plurality of flanges 116 to access water supply line 140 and connection as needed. Transparent cover 120 retains water supply line 140 within formed housing 110 for protection of water supply line 140. Transparent cover 120 is made of durable, transparent material 122 to allow ease of viewing water supply line 140 connection, and has rubber grommet 124 attached to the lower mid-point to allow water supply line 140 to pass through for use as needed.

Figure 4:
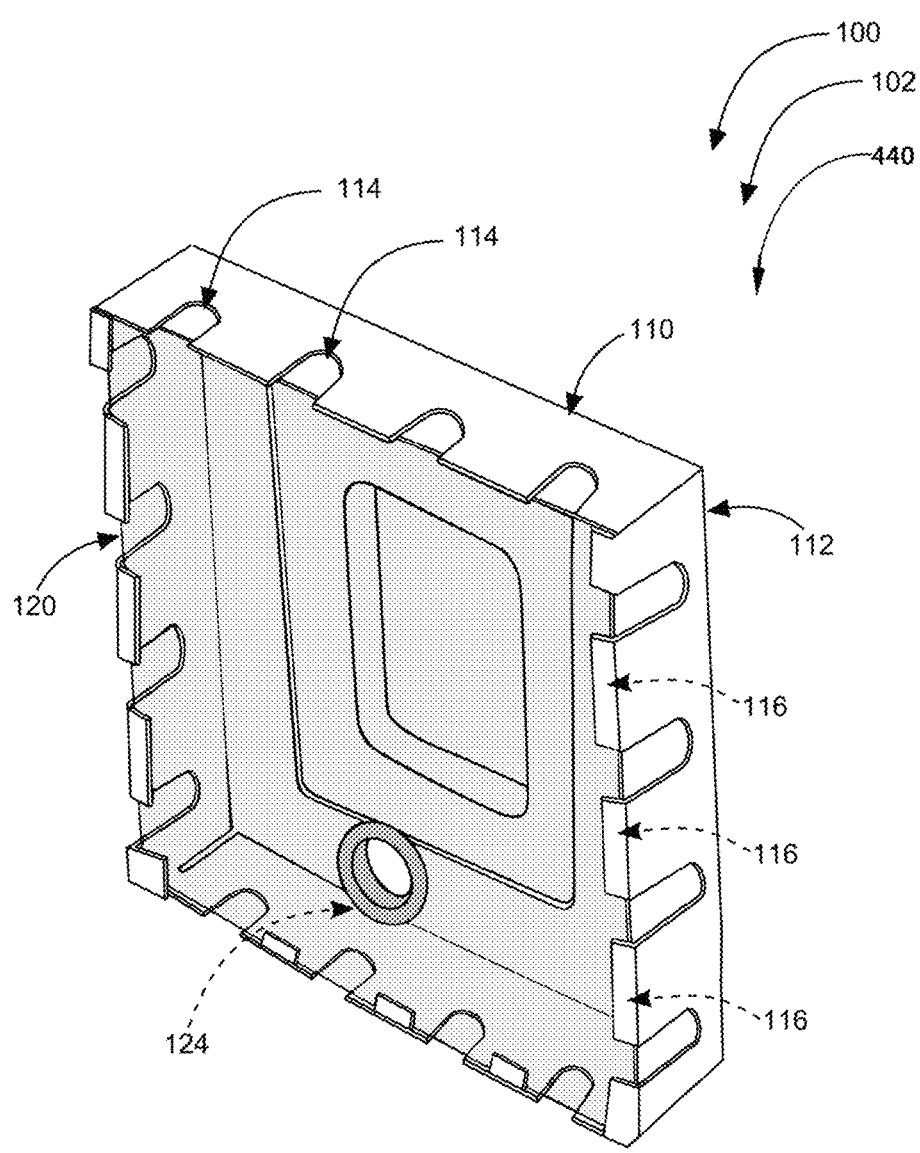
FIG. 4 is another perspective view illustrating the ice maker protection box assembly according to an embodiment of the present invention of FIG. 1.

Referring now to FIG. 4, showing another perspective view of ice maker protection box assembly 102 according to an embodiment of the present invention of FIG. 1.

Ice maker protection box assembly 102 is able to mount to wall surface 130 around water valve assembly 132, allowing water supply line 140 to pass through plurality of indentations 114 and connect to water valve assembly 132, keeping water supply line 140 from pinching and kinking, allowing an unobstructed water supply to the ice maker.

Ice maker protection box system 100 may be sold as kit 440 comprising the following parts: at least one formed housing 110; at least one transparent cover 120; at least one plurality of fasteners 111; and at least one set of user instructions. Ice maker protection box system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
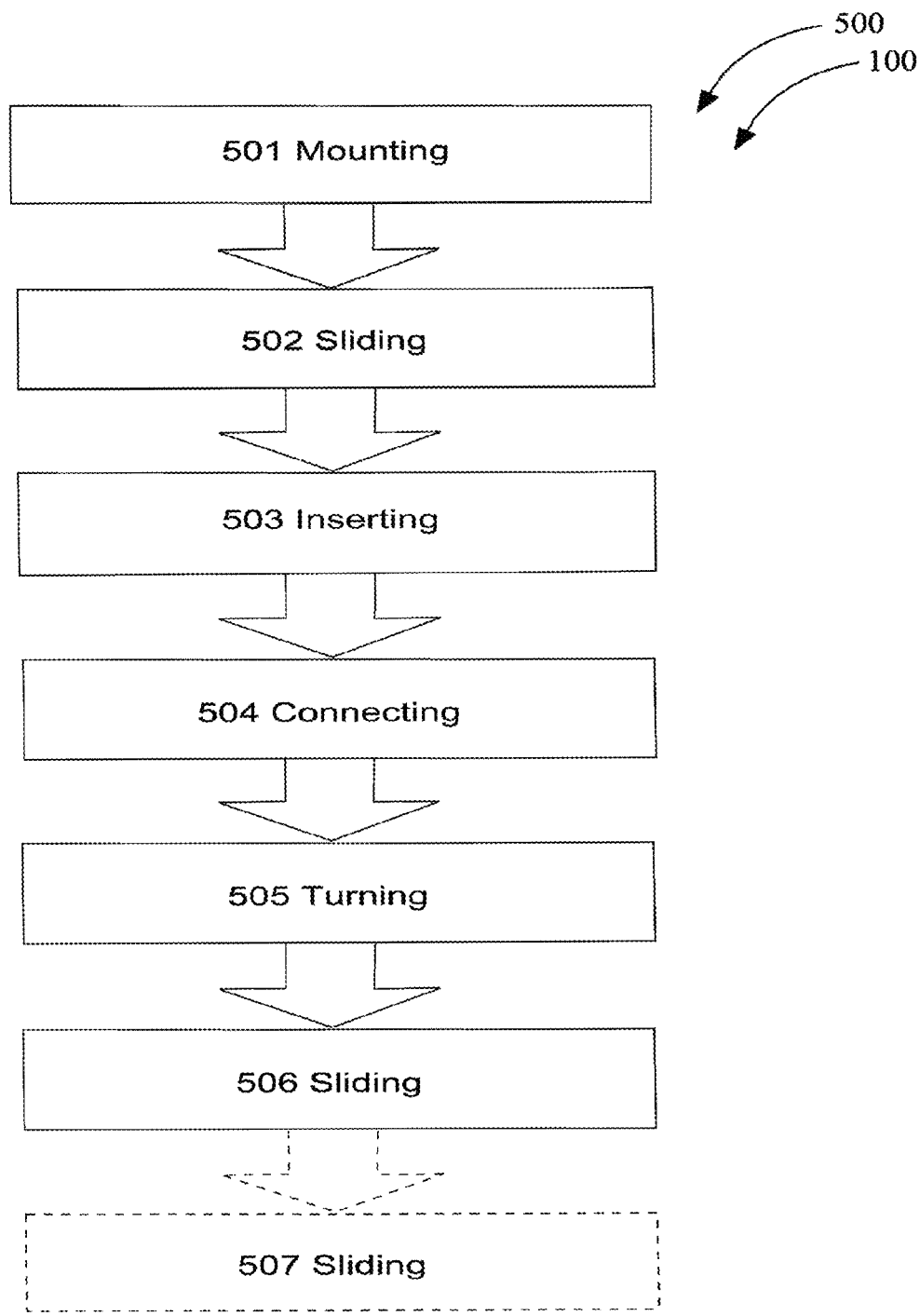
FIG. 5 is a flowchart illustrating a method of use for the ice maker protection box system according to an embodiment of the present invention of FIGS. 1-4.

Referring now to FIG. 5, showing a flowchart illustrating a method of use 500 for ice maker protection box system 100 according to an embodiment of the present invention of FIGS. 1-4.

A method of use 500 preferably comprises step one 501 mounting ice maker protection box assembly 102, step two 502 sliding transparent cover 120 upwardly, step three 503, inserting water supply line 140 through plurality of indentations 114, step four 504 connecting water supply line 140, step five 505 turning on water supply, step six 506 sliding transparent cover 120 down. The method may further comprise step seven 507 sliding refrigerator back against ice maker protection box assembly 102.

It should be noted that step 507 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An ice maker protection box system comprising:
   an ice maker protection box assembly having:
      a formed housing comprising:
         a back side having an opening therein for access to a water valve assembly; and
         a transparent cover;
      wherein said back side is mountable to a flat planar surface;
      wherein said formed housing comprises a plurality of indentations around a periphery to allow a water supply line to be routed therethrough to supply water to an ice maker of a refrigerator;
      wherein said formed housing comprises a plurality of flanges positioned along said periphery to allow said transparent cover to be slideably mounted to said formed housing between said flanges and said back side;
      wherein said transparent cover comprises a rubber grommet removably attached to a lower mid-point to allow said water supply line to alternatively be routed therethrough; and
      wherein said ice maker protection box assembly is able to mount to said flat planar surface around said water valve assembly, allowing said water supply line to pass through one of said plurality of indentations and form a connection with said water valve assembly, keeping said water supply line from pinching and kinking, allowing an unobstructed water supply to said ice maker.

2. The ice maker protection box system of claim 1 wherein said ice maker protection box assembly is 1.5 inches in depth.

3. The ice maker protection box system of claim 2 wherein said formed housing is available in various sizes to accommodate substantially any said water supply line.

4. The ice maker protection box system of claim 3 wherein said ice maker protection box assembly prevents said refrigerator from being pushed against said flat planar surface and pinching said water supply line.

5. The ice maker protection box system of claim 4 wherein said formed housing is able to mount to said flat planar surface with a plurality of fasteners.

6. The ice maker protection box system of claim 4 wherein said formed housing is able to mount to said flat planar surface with double-sided tape.

7. The ice maker protection box system of claim 2 wherein said ice maker protection box assembly comprises a durable plastic material.

8. The ice maker protection box system of claim 2 wherein said ice maker protection box assembly comprises ferrous material.

9. The ice maker protection box system of claim 8 wherein said ice maker protection box assembly mounts parallel to said flat planar surface and around said water valve assembly for protection of said water supply line.

10. The ice maker protection box system of claim 1 wherein said transparent cover retains said water supply line within said formed housing, for protection of said water supply line.

11. The ice maker protection box system of claim 1 wherein said transparent cover comprises durable, flat, transparent material to allow ease of viewing said water supply line connection.

12. The ice maker protection box system of claim 11 wherein said transparent cover is able to slide upwardly along said plurality of flanges to provide access to said water supply line and connection.

13. An ice maker protection box system comprising:
   an ice maker protection box assembly having:
      a formed housing comprising:
         a back side having an opening therein for access to a water valve assembly; and
         a transparent cover;
      wherein said ice maker protection box assembly comprises a durable plastic material;
      wherein said ice maker protection box assembly mounts parallel to a wall surface;
      wherein said formed housing is able to mount to said wall surface with a plurality of fasteners;
      wherein said ice maker protection box assembly is 1.5 inches in depth;
      wherein said ice maker protection box assembly prevents a refrigerator from being pushed against said wall surface and pinching a water supply line for supplying water to an ice maker of said refrigerator;
      wherein said back side is mountable to said wall surface;

wherein said formed housing is available in various sizes to accommodate substantially any said water supply line;

wherein said formed housing comprises a plurality of indentations around a periphery to allow said water supply line to be routed therethrough;

wherein said formed housing comprises a plurality of flanges along said periphery to allow said transparent cover to be slideably mounted to said formed housing between said flanges and said back side;

wherein said ice maker protection box assembly is able to mount to said wall surface around said water valve assembly, allowing said water supply line to pass through one of said plurality of indentations and form a connection with said water valve assembly, keeping said water supply line from pinching and kinking, allowing an unobstructed water supply to said ice maker;

wherein said transparent cover is able to slide upwardly along said plurality of flanges to provide access to said water supply line and connection;

wherein said transparent cover retains said water supply line within said formed housing, for protection of said water supply line;

wherein said transparent cover comprises durable, flat, transparent material to allow ease of viewing said water supply line connection; and wherein said transparent cover comprises a rubber grommet removably attached to a lower mid-point to allow said water supply line to alternatively be routed therethrough.

14. The ice maker protection box system of claim 13 further comprising a kit including: one said formed housing, one said transparent cover, one said plurality of fasteners, and one set of user instructions for use.

\* \* \* \* \*